DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 21, 1970

873 O.G. 687

T873,011

TRANSPARENT COLOURED POLYMERS OF 4-METHYL PENTENE-1

Robert John Taylor, Welwyn Garden City, and Raymond Deverell-Smith, Blackley, England, assignors to Imperial Chemical Industries Limited, London, England, a corporation of Great Britain

Filed July 18, 1969, Ser. No. 843,191

Claims priority, application Great Britain, July 24, 1968, 35,404/68

Int. Cl. C08f *45/66*

U.S. Cl. 260—41

No Drawing. 10 Pages Specification

Transparent, colored polymers of 4-methyl pentene-1 and a hydrocarbon soluble quinone or azo dyestuff are disclosed. The quinone dye has the general formula:

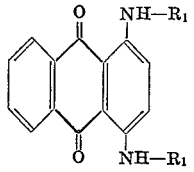

(I)

wherein $R_1$— is an alkyl group, cycloalkyl group of at least 4 carbon atoms, or an aralkyl group of the formula:

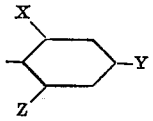

X—may be hydrogen or alkyl,

Y—may be hydrogen or alkyl, and

Z—is a hydrogen, halide or alkyl group, providing the sum of the carbon atoms of X, Y and Z is at least 3.

The azo dye contains at least 4 carbon atoms and may be a monoazo dye, a primary diazo dye, or a diazo dye which is the product of coupling:

(a) an alkyl phenol or alkyl napthol with the alkyl group containing at least 4 carbon atoms, with (b) an aminoazobenzene, aminoazotoluene or aminoazoxylene or mixtures thereof.

The transparent, colored polymers of 4-methyl pentene-1 have a high melting point, good light transmission properties and are used as indicator light covers on cars and on instrument panels.